US010778618B2

(12) United States Patent
Karnin et al.

(10) Patent No.: US 10,778,618 B2
(45) Date of Patent: Sep. 15, 2020

(54) METHOD AND SYSTEM FOR CLASSIFYING MAN VS. MACHINE GENERATED E-MAIL

(71) Applicant: OATH INC., New York, NY (US)

(72) Inventors: Zohar Karnin, Haifa (IL); Guy Halawi, Haifa (IL); David Wajc, Haifa (IL); Edo Liberty, Haifa (IL)

(73) Assignee: OATH INC., New York, NY (US)

( * ) Notice: Subject to any disclaimer, the term of this patent is extended or adjusted under 35 U.S.C. 154(b) by 875 days.

(21) Appl. No.: 14/150,788

(22) Filed: Jan. 9, 2014

(65) Prior Publication Data

US 2015/0195224 A1 Jul. 9, 2015

(51) Int. Cl.
*H04L 12/58* (2006.01)
*G06N 20/00* (2019.01)

(52) U.S. Cl.
CPC .......... *H04L 51/046* (2013.01); *G06N 20/00* (2019.01); *H04L 51/02* (2013.01)

(58) Field of Classification Search
None
See application file for complete search history.

(56) References Cited

U.S. PATENT DOCUMENTS 5,680,511 A * 10/1997 Baker ................. G10L 15/1815
704/257
6,718,367 B1 * 4/2004 Ayyadurai ............. H04L 51/12
370/260

(Continued)

FOREIGN PATENT DOCUMENTS

WO WO-2007145527 A1 * 12/2007 ............. H04L 51/28

OTHER PUBLICATIONS

Arshad, S. et al. (2011). "An anomaly-based botnet detection approach for identifying stealthy botnets". 2011 IEEE International Conference on Computer Applications and Industrial Electronics (ICCAIE). pp. 564-569. DOI: 10.1109/ICCAIE.2011.6162198.*

(Continued)

*Primary Examiner* — Kamran Afshar
*Assistant Examiner* — Benjamin J Buss
(74) *Attorney, Agent, or Firm* — James J. DeCarlo; Greenberg Traurig, LLP (57) ABSTRACT

A computer system, computer program product, and computer-implemented method for communicating electronic messages over a communication network coupled thereto are provided. The computer system comprises a network interface for receiving messages sent over the network and addressed to a user of the computer system; and computer executable electronic message processing software. The software comprises instructions for directing the computer system to receive a message over the network, and to identify whether a sender of the received electronic message is a human or a machine. The identifying includes first and second phases of operation. The first phase includes an offline phase employing information and activities resident on the computer system. The second phase includes an online phase employing resources remotely accessible over the network. The software further includes instructions for providing the user with the results of the identification as human or machine; and for performing automatic data extraction from the message if the message was identified to be from a machine.

18 Claims, 5 Drawing Sheets

(56) References Cited

U.S. PATENT DOCUMENTS

| | | | | |
|---|---|---|---|---|
| 6,832,244 B1* | 12/2004 | Raghunandan | | H04L 51/14 709/206 |
| 6,963,830 B1* | 11/2005 | Nakao | | G06F 16/345 704/1 |
| 7,945,952 B1* | 5/2011 | Behforooz | | G06F 21/316 713/155 |
| 8,468,601 B1* | 6/2013 | Bakhmutov | | H04L 63/1425 709/206 |
| 8,489,689 B1* | 7/2013 | Sharma | | H04L 51/12 709/206 |
| 8,527,436 B2* | 9/2013 | Salaka | | G06Q 10/107 706/13 |
| 8,775,341 B1* | 7/2014 | Commons | | G06N 3/0454 706/20 |
| 9,177,293 B1* | 11/2015 | Gagnon | | H04L 51/12 |
| 9,390,240 B1* | 7/2016 | Brisebois | | G06F 21/31 |
| 9,654,430 B2* | 5/2017 | Chen | | H04L 51/12 |
| 2003/0163790 A1* | 8/2003 | Murata | | G06F 16/345 715/210 |
| 2003/0167245 A1* | 9/2003 | Murata | | G06F 40/289 706/46 |
| 2003/0204569 A1* | 10/2003 | Andrews | | H04L 51/12 709/206 |
| 2004/0203673 A1* | 10/2004 | Seligmann | | H04M 1/72547 455/415 |
| 2004/0254990 A1* | 12/2004 | Mittal | | H04L 12/585 709/206 |
| 2005/0015452 A1* | 1/2005 | Corson | | G06F 17/30247 709/206 |
| 2005/0022008 A1* | 1/2005 | Goodman | | G06Q 10/107 726/4 |
| 2005/0060643 A1* | 3/2005 | Glass | | G06F 17/241 715/205 |
| 2005/0091203 A1* | 4/2005 | Liu | | G06F 16/345 |
| 2005/0108001 A1* | 5/2005 | Aarskog | | G06F 40/289 704/10 |
| 2006/0004748 A1* | 1/2006 | Ramarathnam | | G06F 17/30867 707/999.006 |
| 2006/0031325 A1* | 2/2006 | Cheng | | H04L 51/12 709/206 |
| 2006/0036695 A1* | 2/2006 | Rolnik | | H04L 51/24 709/206 |
| 2006/0190125 A1* | 8/2006 | Stemmle | | G06Q 30/02 700/223 |
| 2006/0242244 A1* | 10/2006 | Logue | | H04L 51/12 709/206 |
| 2007/0118792 A1* | 5/2007 | O'Donnell | | G06Q 30/02 715/205 |
| 2007/0150276 A1* | 6/2007 | Srivastava | | H04L 51/12 704/246 |
| 2007/0208856 A1* | 9/2007 | Rounthwaite | | H04L 51/12 709/225 |
| 2008/0097946 A1* | 4/2008 | Oliver | | G06N 20/00 706/46 |
| 2009/0113016 A1* | 4/2009 | Sen | | H04L 12/58 709/207 |
| 2009/0157513 A1* | 6/2009 | Bonev | | G06Q 10/109 705/14.69 |
| 2009/0249481 A1* | 10/2009 | Long | | H04L 51/12 726/22 |
| 2010/0049809 A1* | 2/2010 | Ladd | | G06Q 10/107 709/206 |
| 2010/0161748 A1* | 6/2010 | Kojima | | G06Q 10/107 709/206 |
| 2010/0250497 A1* | 9/2010 | Redlich | | F41H 13/00 707/661 |
| 2011/0055332 A1* | 3/2011 | Stein | | G06F 17/30675 709/206 |
| 2011/0191423 A1* | 8/2011 | Krasser | | G06F 21/552 709/206 |
| 2011/0235788 A1* | 9/2011 | Jesse | | H04L 51/14 379/88.22 |
| 2011/0246496 A1* | 10/2011 | Chung | | G06F 16/951 707/766 |
| 2011/0252472 A1* | 10/2011 | Ehrlich | | H04L 63/1441 726/22 |
| 2012/0011453 A1* | 1/2012 | Shimono | | G06Q 10/107 715/753 |
| 2012/0143961 A1* | 6/2012 | Jonsson | | G06Q 10/1093 709/206 |
| 2012/0215852 A1* | 8/2012 | Chen | | H04L 51/12 709/206 |
| 2012/0323700 A1* | 12/2012 | Aleksandrovich | | G06F 21/36 705/14.69 |
| 2013/0018964 A1* | 1/2013 | Osipkov | | H04L 67/306 709/206 |
| 2013/0247192 A1* | 9/2013 | Krasser | | H04L 63/1425 726/23 |
| 2014/0115067 A1* | 4/2014 | Rosenwald | | G06Q 10/107 709/206 |
| 2015/0019910 A1* | 1/2015 | Simon | | G06F 11/1402 714/16 |
| 2015/0033141 A1* | 1/2015 | Mishra | | H04L 51/22 715/752 |
| 2015/0100356 A1* | 4/2015 | Bessler | | G06Q 30/01 705/7.12 |
| 2015/0193414 A1* | 7/2015 | Peters | | H04L 51/066 715/230 |
| 2015/0193441 A1* | 7/2015 | Jamrog | | G06F 16/24578 707/748 |
| 2015/0294377 A1* | 10/2015 | Chow | | G06Q 30/0263 705/347 |
| 2016/0119268 A1* | 4/2016 | Sharp | | H04L 51/12 709/206 |

OTHER PUBLICATIONS

Gianvecchio, S. et al. (2008). "Measurement and Classification of Humans and Bots in Internet Chat". 17th USENIX Security Symposium. pp. 155-169.*

Gummadi, R. et al. (Apr. 2009). "Not-a-Bot: Improving Service Availability in the Face of Botnet Attacks". In NSDI (vol. 9, pp. 307-320).*

Stolfo, S.J. et al. (2003). "Behavior Profiling of Email". In: Intelligence and Security Informatics. ISI 2003. Lecture Notes in Computer Science, vol. 2665. pp. 74-90. DOI: 10.1007/3-540-44853-5_6.*

Jackson, T. et al. (2003). Reducing the effect of email interruptions on employees. International Journal of Information Management, 23(1), 55-65. DOI:10.1016/50268-4012(02)00068-3 (Year: 2003).*

Gianvecchio, S. et al. (2008). "Measurement and Classification of Humans and Bots in Internet Chat". 17th USENIX Security Symposium. pp. 155-169. (Year: 2008).*

Cormack, G.V. (2008). "Email Spam Filtering: A Systematic Review". Foundations and Trends in Information Retrieval. vol. 1, No. 4 (2006) 335-455. (c)2008. DOI: 10.1561/1500000006 (Year: 2008).*

Chu, Z. et al. "Detecting Automation of Twitter Accounts: Are You a Human, Bot, or Cyborg?" IEEE Transactions on Dependable and Secure Computing, vol. 9, No. 6, Nov./Dec. 2012. pp. 811-824. (Year: 2012).*

Subramaniam, T. et al. "Overview of textual anti-spam filtering techniques". International Journal of the Physical Sciences vol. 5(12), pp. 1869-1882, Oct. 4, 2010. (Year: 2010).*

Martinez-Romo, J. et al. (2013) "Detecting malicious tweets in trending topics using a statistical analysis of language". Expert Systems with Applications, vol. 40, Issue 8, Jun. 15, 2013, pp. 2992-3000. DOI:10.1016/j.eswa.2012.12.015 (Year: 2013).*

* cited by examiner

METHOD AND SYSTEM FOR CLASSIFYING MAN VS. MACHINE GENERATED E-MAIL

FIELD OF THE ART

The present subject matter generally relates to the field of electronic network communication and messaging. The disclosure pertains to processing incoming messages to ascertain facts about their origin.

BACKGROUND

Network users, such as Internet users, receive large volumes of messages, such as e-mails. Some of these messages pertain to business or professional subject matter, others pertain to people, events and activities of interest to the user, and still others pertain to advertisements. Some messages are sent specifically to one particular recipient, and others are broadcast to large numbers of recipients. The content of a message, the identity of the author of the messages, and the identity of the sender may all have a relationship to the user's level of interest in the message.

A given user may receive a volume of messages great enough that it becomes a time burden to give even cursory review to each received message. Accordingly, users can benefit from having tools and techniques for coping with a volume of received e-mail, to help determine which messages require relatively greater or lesser amounts of attention, time, or priority.

SUMMARY

A computer system, computer program product, and computer-implemented method for communicating electronic messages over a communication network coupled thereto are provided.

The computer system comprises a network interface for receiving messages sent over the network and addressed to a user of the computer system; and computer executable electronic message processing software. The software comprises instructions for directing the computer system to receive a message over the network, and to identify whether a sender of the received electronic message is a human or a machine. The identifying includes first and second phases of operation. The first phase includes an offline phase employing information and activities resident on the computer system. The second phase includes an online phase employing resources remotely accessible over the network. The software further includes instructions for providing the user with the results of the identification as human or machine; and for performing automatic data extraction from the message if the message was identified to be from a machine.

Further features and advantages of embodiments of the subject matter disclosed herein, as well as the structure and operation of preferred embodiments, are described in detail below with reference to the accompanying exemplary drawings.

DETAILED DESCRIPTION

The present subject matter provides a method, computer program product and system for determining whether a received message came from a human or from an automated machine or process. The following detailed description is intended to provide example implementations to one of ordinary skill in the art, and is not intended to limit the invention to the explicit disclosure, as one of ordinary skill in the art will understand that variations can be substituted that are within the scope of the invention as described.

Embodiments of the subject matter here disclosed provide the ability, automatically to determine whether a given message was generated by human being, or by an automated process. It is anticipated that users will find it useful to know which of the two possible origins is the case, and thereby to classify the emails for different handling, evaluation, examination, automatic data extraction from the message, etc. For instance, messages may be handled in distinctive manners, based on whether they originate with humans or machines, the distinctive manners including automated data extraction, classification of the sender type for future reference, etc.

The Turing Test

Computer science pioneer Alan Turing conceived a test, or "imitation game," whose objective was for an interrogator to determine, by posing questions and receiving answers, whether a party being so interrogated was a human or a machine. Turing anticipated that future developments in computer science might eventually reach a point in time where, to a significant probability, the interrogator might be unable to determine human-or-machine, and that the machine is thus exhibiting a level of thought.

The present subject matter might be construed as a benchmark in the path toward achieving part of the object of the Turing Test. If a given communication can be construed by its recipient as originating either from a human or a machine, it may defeat the Turing Test, or at least represent a postponement of the point in time that Alan Turing foresaw.

However, certain practical advantages of a system and method according to the present subject matter may benefit users/message recipients. For one thing, a user handling a substantial volume of incoming messages may be better able to cope with the message volume by using the human/machine distinction to prioritize the message, and to judge how much time and attention to devote to the message. Additionally, the user's system might support an automatic data extraction functionality, which can be applied to received messages selectively, based on whether the messages are from a human or a machine.

Identity of the Source of the Message

There are potentially as many as three distinct parties involved, in one way or another, who could be considered the source of a received message. These parties are (i) the author/writer/composer of the message; (ii) the party that chooses the recipient(s) of the message; and (iii) the party that actually takes the action of sending the message.

As to (i), the party that writes the message may do so in a way that gives information, or inferences, regarding his/her/its identity. If the author identifies him/her/itself in the body of the message, the recipient may easily ascertain this. This is likely to be the case, for instance, if the message is a personal or business note from one sender to one recipient, where the sender and the recipient are acquainted with each other. Note that the "From" field of a message does not necessarily identify the author. Rather, it identifies, for instance by e-mail address, the sender. As noted above, the sender is not necessarily either the author or the recipient chooser.

As to (ii), the party that chooses the recipient or recipients may be identical to (i) the author. That is likely to be the case if the message is sent to the user, as the only recipient (e.g., the business or personal messages referred to above). If the message is broadcast to many recipients, as well as to the user who is under consideration here, then it is likely to be some sort of broadcast advertisement or news item. From this, there may be a fair inference that the message was generated by a machine, or that the recipients were selected by a machine.

Whether the message was sent to one recipient alone, to a small number of recipients, or to many recipients may be evident from presence and the content of the message headers, such a recipient field, a cc: (copy to) field, and/or a bcc: (copy to, anonymously to other recipients) field. The presence of such fields may give insight, even if the identities of the recipients are not visible.

As to (iii), the party that actually sends the message may be the easiest to identify, because the e-mail address of the sender provides the user with some direct information regarding the source of the message. The user might recognize a familiar e-mail address, or might recognize an address which is unfamiliar, but nevertheless is suggestively similar to a party known to the user, for instance by resembling the name of a party known to the user. By contrast, machines which send messages automatically, particularly of the messages are broadcast to large numbers of recipients (news items and advertisements, for instance), may use Web addresses that are more generic or abstract, so as to reveal less information about their identities. On the other hand, the network addresses may contain trade name or trademark-related information or the like, which in fact does give information about a manufacturer, distributor, retailer, news agency, etc., which was the origin of the message.

For the purpose of the present subject matter, that a human or a machine, which performs any of the above three activities, is considered to be within the spirit and scope of the present subject matter. Terminology in the discussion which follows, such as "message sender," "message generator," "source of the message," or the like, will be understood broadly (unless limited in a way made clear by the context) to refer, potentially, to any of the above three parties that may be involved in preparing and sending messages.

Operation of an Embodiment

Figure 1:
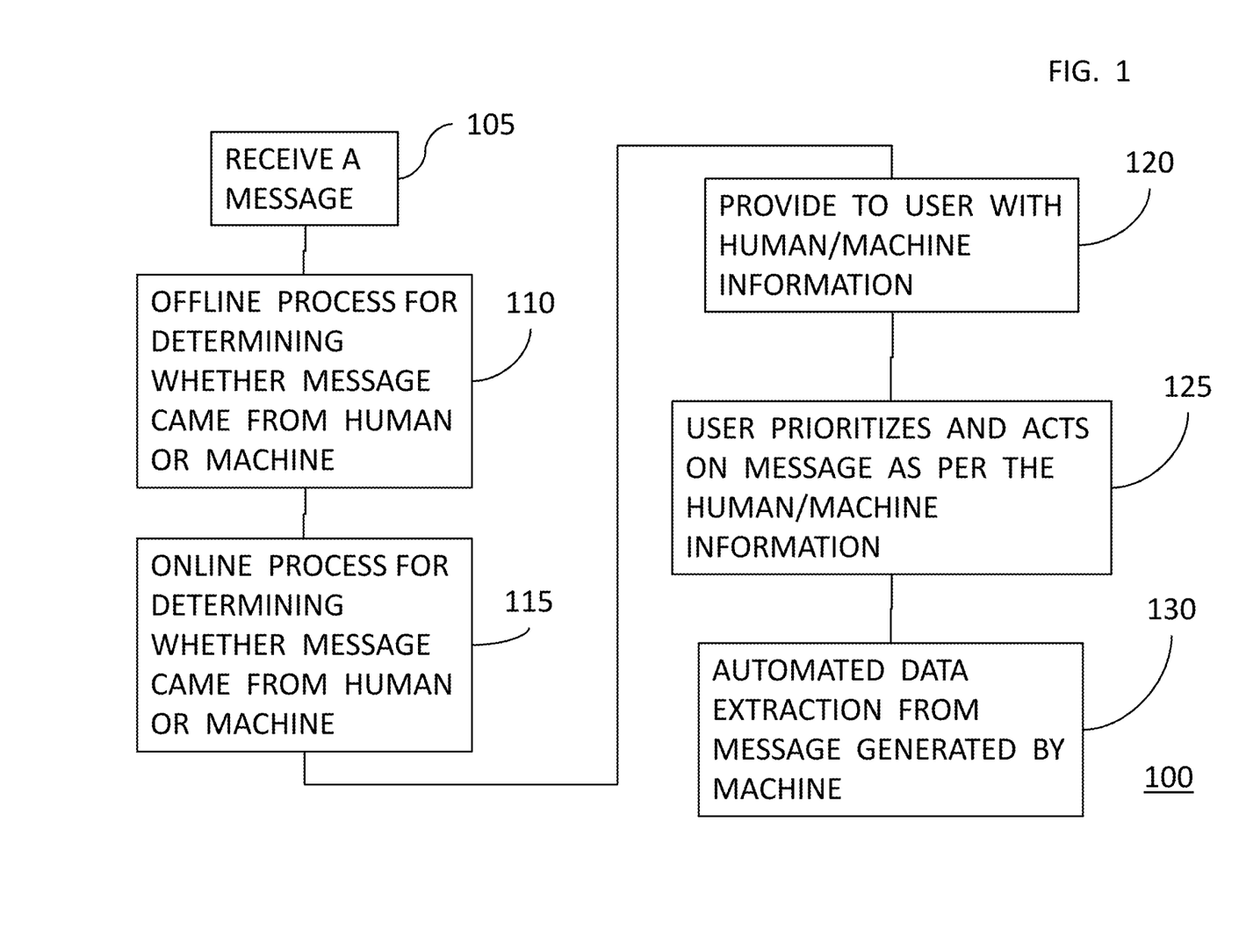
FIG. 1 is a flowchart showing operation of an embodiment of the present subject matter.

FIG. 1 is a flowchart showing operation of an embodiment of the present subject matter. With reference to the discussion above, the flowchart of FIG. 1 is executed by a user who has received a message (105) over a communication network. The message may be an e-mail message, or other types of electronic messages such as "tweets," etc.

In an embodiment, the user system and method may have multiple distinct operational phases, such as an offline phase and an online phase. Each phase represents a process for determining, using respective techniques and resources, whether the messages is from a machine of a human. The phases may be done in the alternative, concurrently, or in a predetermined order. The user may select from among these alternatives, or they may operate according to a predefined schedule.

In the embodiment of FIG. 1, two operational phases, offline (110) and online (115) are shown. For the present discussion, they will be discussed separately, and they may be executed sequentially, in the order shown in the flowchart. However, as discussed just above, they may alternatively be executed in a different order, or simultaneously, or one but not the other, etc. Also, additional phases of operation (not shown) may be executed, as well.

Detailed discussion of the offline (110) and online (115) phases of operation of the embodiment of FIG. 1 will be given below. First, a discussion of the remaining elements of FIG. 1 will be given.

After the determination is made whether a received message came from a human or a machine (for instance the results of the offline (110) and online (115) phases of operation), the result may be provided (120) to the user. Alternatively, if the user does not have an immediate need for this information, for instance if the user system is processing incoming messages automatically, them providing (120) the human/machine information to the user may be omitted.

If the results of the human/machine determination are provided (120) to the user, then the user may employ that determination as he/she sees fit. This may, for instance, include prioritizing (125) the message for action. If the message is deemed to be from a human sender, the user may immediately want to identify who that human is. The information provided (120) to the user may include the identity of the human sender. If it does not, the user may put a priority on looking at the message header and scanning its body, at least far enough to allow the user to establish the identity of the human sender. That will allow the user to prioritize the message by determining factors such as (i) whether the message is from a personal friend or relative, (ii) whether the message pertains to an upcoming event that the user and the human will be participating in, (iii) whether the message pertains to a situation which may require the user's assistance, (iv) whether the message is from a business colleague, (v), whether the message requires the user to make a decision from among various alternatives, (vi) whether the message gives the user a time frame or deadline for performing a task, (vii) whether the message requires a reply, etc. If the message is from a human sender who has en an existing relationship with the user, then the user will likely know, from the context of the user's relationship with the human sender, what sort of information, or requirements, the message is likely to contain. All of this information will help the user determine whether the message can wait, for instance by sitting in an in box until the following day, or whether the user needs to put other matters aside until he/she deals with the message.

If, on the other hand, the determination (115) is that the message is from a machine, then the user may still prioritize the message highly. For instance, the message might be a system-generated news item pertaining to a matter in which the user has significant interest. For example, the user may have registered with a Web site in advance, requesting to be notified immediately when a news item of interest is released to the public. The message might also be an advertising message, which happens to be advertising something the user is interested in buying or otherwise patronizing. For example, the message might be that an upcoming concert or sporting event, which had been sold out, now has tickets available. In such case, the user might immediately want to place an online order for tickets to the event.

The user might alternatively place a relatively low priority (125) on the machine-sent message. For instance, the message could be a news event which the user has a moderate but not immediate interest, such as a weather or traffic report which will concern the user only if and when the user is ready to go outside. For example, if the user plans to stay late at work, an evening rush-hour traffic report will be of relatively low interest and urgency. If the message is an advertisement pertaining to a product or service the user contemplates purchasing in the future, the message might be informational, but not requiring prompt attention. In such cases, the user might find it sufficient to know merely that the message was machine-generated. That information then would be sufficient for the user to prioritize the message lower, to be examined when the user is not occupied with more important or pressing matters.

In some cases, particularly when the message is determined (115) to be from a machine, it may be possible to extract (130) information from the message automatically. For example, if the machine-generate message is a product or service advertisement, an automated system might be able to extract information such as (i) the product name and type, (ii) a model number for the product, (iii) the price, (iv) a manufacturer, distributor or retailed from whom the product may be obtained, and (v) contact information such as address, telephone number, network address, etc.

If the machine-originating message is a news item, then it may be possible, with reasonable processing of language syntax in the message, to extract essentials of the news story, such as the familiar Who-What-When-Where-Why-How questions that are often deemed to be the sine qua non of any news reporting. Additionally, proper names of involved parties, etc., may be extracted.

The user may also find it valuable, if a message is identified as from a machine, to determine what type of sender. For instance, the factors just discussed could be used in distinguishing between an advertising message and a news bulletin. Other classes of machine senders may also be identifiable similarly, based on the sort of characteristics their messages may have.

Phases of Operation of an Embodiment (110 and 115)

In an embodiment of a system or method of the disclosed subject matter, there may be distinct phases of operation, which may operate independently of each other, concurrently, in sequence, collaboratively, etc. The phases may be distinguished from each other based on the resources they require for operation, and/or the various techniques of operation that they utilize.

An embodiment may include two such phases of operation. For instance, the two phases may be described as offline and online, respectively. In general, the various aspects, techniques of operation, etc., may be classified as offline or online based on whether or not their operation requires or utilizes a network connection, communication with the sender or with any other remote entity, access to remotely available information, etc. These two phases of operation will be discussed separately.

Offline (110) Phase of Operation

Offline operation may utilize resource information that is available on the user's system itself, so that network communication is not required for operation. The resource information may, for instance, include information accumulated from past operation into a library or directory maintained by the user system, such as a library of network addresses and metadata associated with the past messages, along with known information about the persons or systems which use the addresses. The offline phase of operation may thus include comparing the addresses of newly received messages with the contents of the library.

Figure 2A:
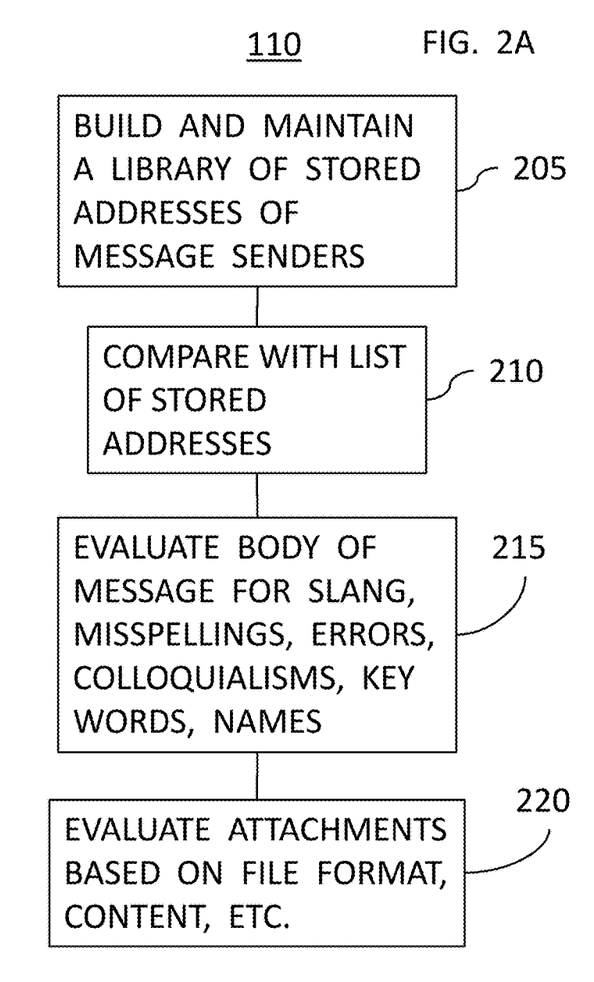
FIGS. 2A, 2B and 2C are flowcharts showing further details of the operation of an element of the embodiment of FIG. 1.
Figure 2B:
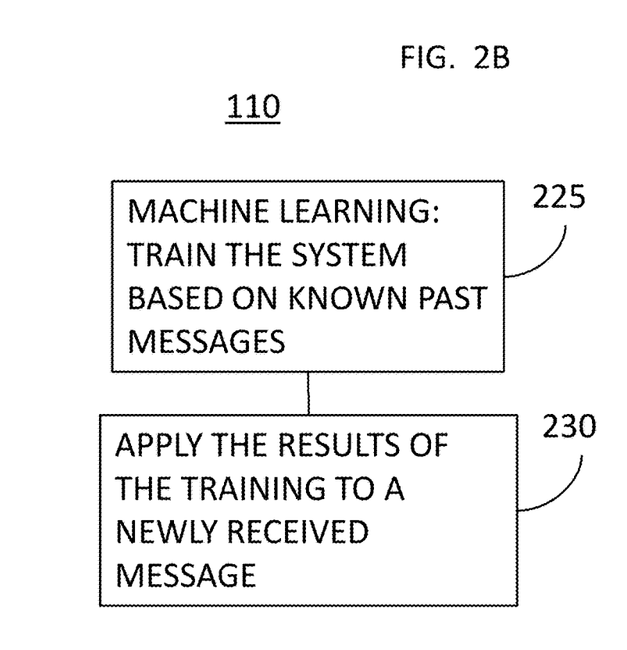
Figure 2C:
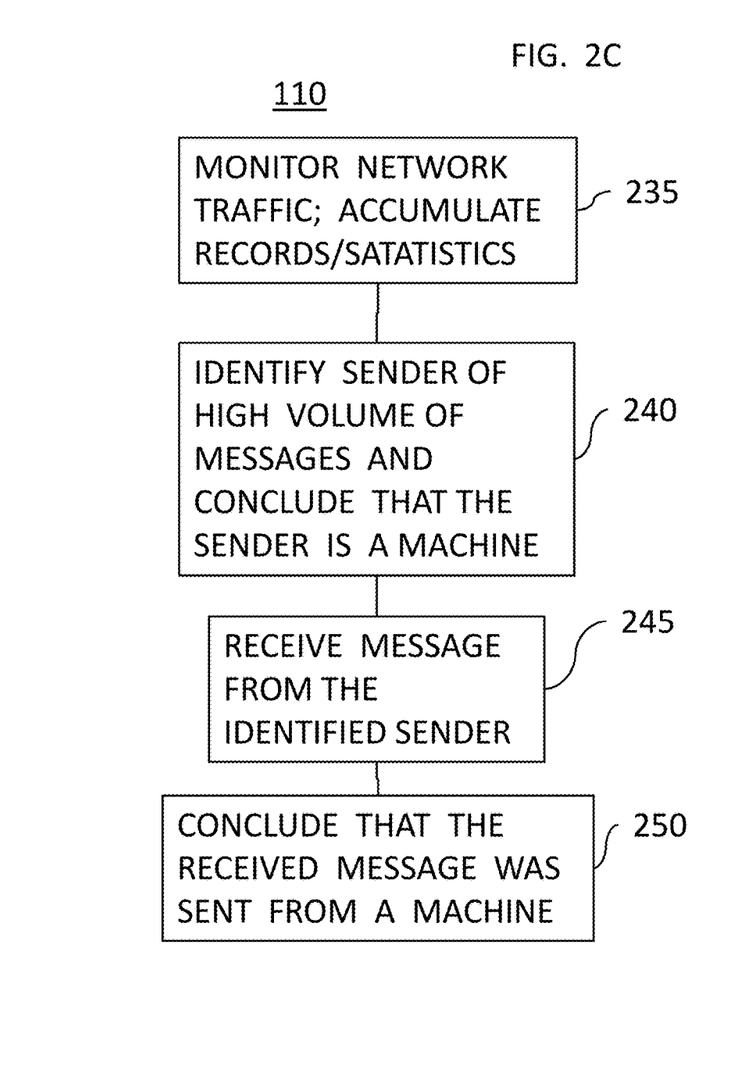

Embodiments of an offline phase are shown in FIGS. 2A, 2B, and 2C. Their respective functionalities may, in any sequence or combination, be embodied in the presently disclosed and claimed subject matter.

Offline Classification Based on Message Content: FIGS. 2A and 2B

The content of various messages may provide insight into the source of the message, and the source's intentions regarding the message.

Offline Classification Based on Message Content: 1. Header

Message headers, such as e-mail headers, often contain descriptive information, such as the name of the sender, the sender's organization, the sender's profession, hobbies, or personality traits, etc. Individuals often embed some of this sort of information into their e-mail addresses. Messages from individuals that are personally known to the user may have network addresses that are known by, and thus familiar to, the user.

Commercial organizations such as manufacturers, distributors, wholesalers, retailers, news agencies, public commercial facilities, etc., often include their names or other identifying information within their web addresses as part of their marketing strategies. Thus, the presence of any of this sort of information makes it likely that the message is from a machine. The user may already know that a given such network address indicates that the message is from a machine, or the user system may deduce that the message is from a machine (see below, in connection with machine learning).

An embodiment of offline classification based on message content is given in FIG. 2A. A user system can maintain a directory (205) of known network addresses, with classification as either human- or machine-generated messages. A user system, working to identify the source of a given received message, can compare (210) the message's network address against those in the directory. If a match is found, the directory entry indicates which kind of party was the originator of the message.

Offline Classification Based on Message Content: 2. Body

The body of a message may contain a wide variety of information, and the information may be presented in a wide variety of forms and arrangements. Classification of human versus machine may be done based on a similarly wide variety of criteria. These criteria are assessed by evaluating (215 of FIG. 2A) the body of the message. This evaluation may also include substantive elements of the header, such as a subject field.

A message composed by an individual, to be sent to another individual may be subjected to less proofreading and revision than a message generated by a machine. Thus, a relatively great number of spelling and grammatical errors may indicate lack of proofreading, and by inference may indicate authorship by a human.

Similarly, the use of slang expressions, or references to topical or popular cultural elements, may also indicate authorship by a human rather than a machine.

A personal message might include instances of the name of the sender or the recipient. First names (e.g., John) rather than formal salutations by last name (e.g., Mr. Doe) indicate that the message is personal, and intended for one specific recipient, and therefore is likely to have been written by a person rather than by a machine.

On the other hand, some automatic mailing systems use what has been called "the mass-produced personal touch," in which a personal-style message includes fields within which names from a mailing list can be inserted automatically. While this can give a misleading impression that the message is personal, the success of such a mass-produced personal touch depends on the integrity of the data entered in the mailing list employed. If there are mistakes in the mailing list, obvious, and sometimes comical, errors result. For instance, if the database of recipient names and addresses happens to include a mistake in name-and-address entry, such as an apartment number on the same line as the recipient's name, then an automated system might address John Doe 304 as "Mr. 304." If such an error is detected, and the sender is thus deemed to be a machine, the user system can log that sender's network address into an address library, and know, from then on, that messages from that sender are machine-generated.

Offline Classification Based on Message Content: 3. Attachments

The number (if any) of attachments to a message, and the type of attachments, may also give insight into whether a message came from a human or a machine. Also in the embodiment shown in FIG. 2A, any such attachments to the message may be evaluated (220). For instance, attached photographs, which may be in the form of .gif files or other common formats, likely may have been sent by a human. They may, for instance, be personal photos, baby pictures, etc. Attached .pdf files, or the various types of files from Microsoft Office applications, etc., likely were sent from a human, either a business colleague of the attachments are work-related, or from a friend or relative if they are more personal in nature. It may be inferred that spreadsheets and slide sets are more likely to be business-related, while word-processed text documents carry less of a presumption one way or the other.

However, machine-generated advertisements or news bulletins may also bear such attachments. Accordingly, in many cases the attachments might not be regarded as conclusive, in the absence of other indications of human or machine origin.

Offline Classification Based on Machine Learning Techniques

The concept of machine learning, as an adjunct of artificial intelligence, may also be used in performing off-line classification of a received message as being either human- or machine-originating. Machine learning focuses on prediction, based on known properties learned from training data. (As an aside, another technological field which has used such machine learning and training has been that of neural network circuitry, applied to the task of optical character recognition.)

For instance, an existing corpus of previously received messages may have already been classified as originating from either a human or a machine. Each of the previously received messages may have properties, for instance any of those discussed above. The properties may be Boolean (yes or no; the property is present or is not present) or may have a quantitative value. Quantitative values having both upper and lower bounds may be evaluated according to those bound values, or may be normalized (typically, on a scale from 0 to 1). Unbounded values may be measured in other suitable ways. For instance, a suitable way for measuring the presence of slang expressions or current colloquialisms may simply be a count of the number of such expressions, etc.

Given these measurements of the various properties, the training portion (225 in FIG. 2B) of machine learning involves correlating the values for the various parameters with the known end result of either human or machine origination of the messages. The results of the training may be, for instance, that high normalized values for two parameters may be a strong indication that the message was from a human, but that high values for either one by itself are not so indicative. The training may also establish threshold values for the parameters. In the example just mentioned, the two parameters must have at least specified values, in order for there to be an indication of the message's origin.

In an embodiment, the system or method may support training a classifier. A classifier uses information empirically accumulated from a history of messages, and develops patterns, hypotheses, and conclusions which may be applied to future incoming messages. Messages may contain many different types of indicia that a classifier can use to determine whether the message is from a person or a machine. Several examples will now be given.

For example, an accumulated history of past messages might follow a pattern in which a number of network addresses of senders include a commonly recognizable first name followed by one or more numeric digits. If a threshold percentage of such messages are known to have come from individual persons, then the classifier might be trained to recognize incoming messages sent under a message address including a name followed by numeric digits as being from a human, and might hypothesize that newly received message with a name followed by numeric digits likewise is also from a person, rather than a machine.

As another example, the bodies of messages might include current slang expressions or abbreviations, or certain frequently occurring grammatical mistakes, which can be recognized. Persons composing such messages are likely to use slang or grammatical errors consistent with their patterns of speech. Thus, it might be possible to train a classifier to conclude, from a detected threshold number of those occurrences, that the message came from a person.

If a message includes recognizable trademarks, product names, process in the form of dollar signs and numbers, etc., then a classifier can be trained to conclude that such messages are advertisements which were generated by machines.

Certain common sales-related words and phrases, such as "limited-time offer," "buy now and save," etc., may indicate that the message is a machine-generated advertisement. Certain expressions, such as news service bylines (Associated Press, Reuters, etc.), indicate that the message is likely to be a machine-generated news bulletin.

News stories tend to encapsulate the gist of the story within a single sentence at the beginning of the story. Techniques for identifying such leading sentences may also indicate that the message is a machine-generated news bulletin. For instance, the system may identify keywords that occur throughout the story, and then check how many of the keywords occur in the first sentence. If a threshold keyword count or ratio is exceeded, then it is determined that the message is a machine-generated news story.

When a user system which has been trained as described above receives a message, the newly received message may be identified, as being either from a human or a machine, by applying (230) the training to the message.

If a message contains a mixture of machine and human indicia, such as those given above, then the classifier can be trained to determine, human or machine, by comparing and weighting the various indicia. For instance, if the just-mentioned messages are classified as machine-generated advertisements or news bulletins, then that classification may be the result of identifying the factors that indicate machine origin. Comparable to the burdens of persuasion in the legal field of evidence, those factors might be deemed sufficient to make a prima facie case that the message was machine-originated. Unless there are persuasive countervailing indications that the message might be from a human, who for instance may be merely quoting what an advertisement or news bulletin said, the training might cause the system to conclude that the message was machine-generated.

Offline Classification Based on Message Count

In a further embodiment shown in FIG. 2C, the user system may monitor traffic (235) over the communication network, and accumulate counts or statistics over an extended period of time, which could for instance be weeks or months. It may become apparent, from such monitoring, that a high volume of messages (240), which may be addressed to many different recipients, originate from the same sender. Assuming that such a volume of messages exceeds (245) a predetermined threshold, it is possible to conclude (250), with no further evaluation, that the sender must be a machine.

This is comparable to the situation in which a message is directed to a large number of recipients, based on the contents of the recipient field, the cc: field, and (if applicable) the bcc field. However, instead of merely relying on the contents of those fields in the message header, the user system additionally observes other messages, which may have been sent separately to different recipients or groups of recipients over an extended period of time. Thus, the user system need not rely solely on the fields within the message to know with how many recipients the sender is communicating.

It is noteworthy, however, that this type of processing may advantageously save processing time and resources, because the conclusion of machine origination is reached without having to examine or process any of the content of the message. This may be a factor to take into consideration when determining which of the phases, offline 110 and online 115, are executed, and in which sequence.

Figure 3:
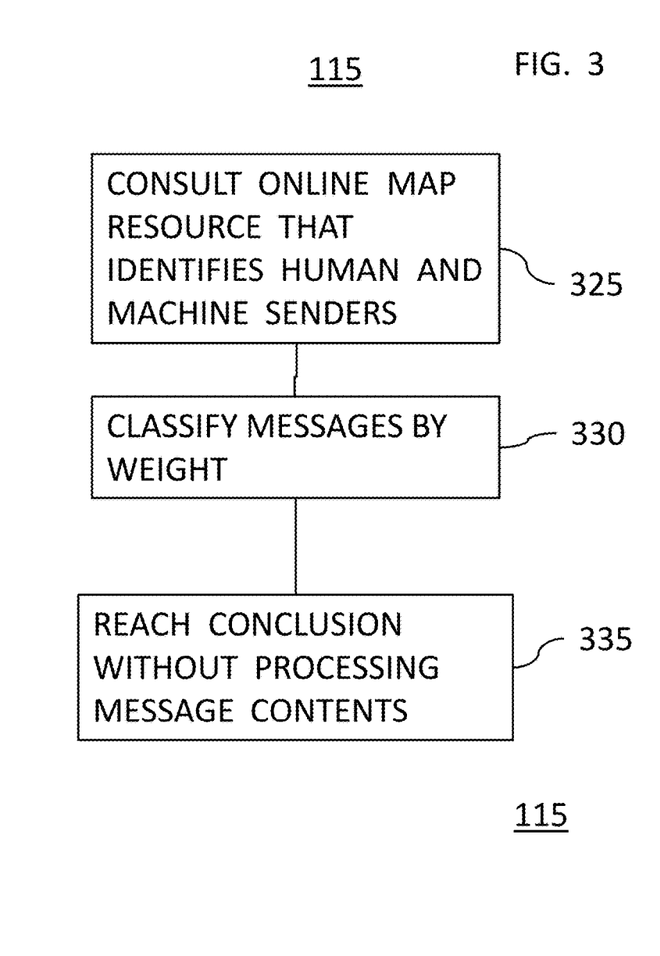
FIG. 3 is a flowchart showing further details of the operation of another element of the embodiment of FIG. 1.

Online (115) Phase of Operation: FIG. 3

The online phase of operation generally includes operations that involve accessing information or functionality remotely over the network, during the time between receipt of the message to be identified, and reaching a human-or-machine conclusion as to that particular message.

One technique within the online phase is applicable where there is a resource that can be consulted (325), such as a map correlating senders with their classification as a machine or human. The map may be maintained by a remote network entity, thus requiring network communication for accessing its contents. The map may, for instance, have been produced by accumulating conclusions as to messages previously sent over a period of time. Reference to such a resource can provide an answer (335), machine or human, again without requiring a great deal of processing. The map may include communication networks (for instance, e-mail addresses, or may include other types of information that can be obtained from such monitored message traffic.

Another technique within the online phase includes weight classification (330), based on factors such as the number of messages sent by the sender of the presently received message. For instance, if the number of messages from the sender exceeds a predetermined threshold, then the message is deemed to be from a machine. This technique may be compared with the technique of FIG. 2C, in which elements 235 and 240 accumulate records or statistics of message traffic over an extended period of time, and maintain those records or statistics locally, for offline use. By contrast, the online technique of element 330 of FIG. 3 is used when the volume of messages sent from the sender is observed at essentially the same time as that message actually received by the user system, for instance during an online session on the network. The number of such messages may, for instance, be great enough to exceed a predetermined threshold value. Detection of a sufficiently large number of such messages may be deemed a weight factor which indicates that the sender was broadcasting the message identically to a large number of recipients. As with the case of news stories and advertisements discussed above, this sort of message may thus be deemed to be machine-generated.

Operating Environment

Figure 4:
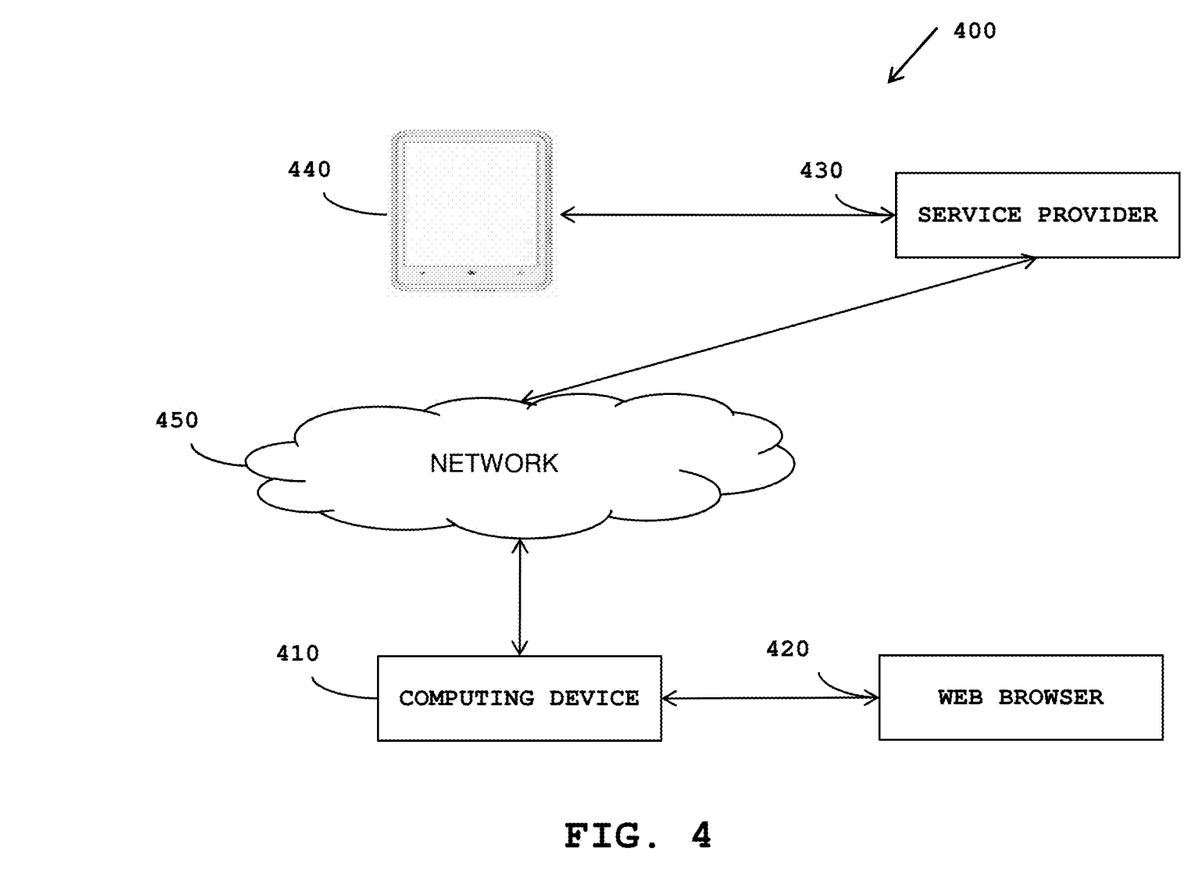
FIG. 4 is a block diagram of a network communications environment within which embodiments of the present subject matter may be practiced.

FIG. 4 is a block diagram illustrating a system for providing a user with communication network access and for displaying a predetermined message during a download latency time on a mobile device, in accordance with one embodiment.

The system 400 can implement the method described above. The system 400 includes a computing device 410 such as the user appliance discussed above, a web browser program 420 installed and functioning thereon, a service provider 430, and a remote device 440 in communication with a network 450 (for example, the Internet or a cellular network).

Examples of the computing device 410 include, but are not limited to, a Personal Computer (PC), a laptop or notebook computer, a tablet computer, a smart phone or Personal Digital Assistant (PDA), a smart appliance, an Internet television or any other suitable processor-based device that can display web pages.

The computing device 410 includes a display, a user input interface such as a keyboard and mouse, and runs a web browser 420. The web browser is a software application for retrieving, presenting and traversing information resources on the World Wide Web (WWW). The information resources are web pages, images, videos or other forms of content. The web browser can be a desktop web browser (for example, Internet Explorer, Mozilla, or Chrome), a mobile browser, or a web viewer built integrated into an application program. The web browser 420 could also be a native mobile application and would operate in a manner consistent with the description provided here.

The web browser 420 loads desired web pages for the user. The web pages can include textual information, digital images, video and static advertisements, and other digital assets.

The service provider 430, for example Yahoo! and Gmail, provides email services to users of the computing device 410 through the network 450. The email services enable users to send, receive and review email from corresponding web browsers. Examples of email services include, but are not limited to, Yahoo! Mail, Gmail, Hotmail and AOL Mail. The description presented here applies to other content types which the service provider 430 might provide; including, for example, news results, search query results, or video and music content.

The remote device 440 may be a server, etc., operated by an outside entity who has a desire to make certain information, such as advertisements, available to users, under circumstances in which the users will see the advertisements even though they may not have sought out the advertisements. The remote device 440 is connected to the service provider 430.

Generally as described in connection with FIG. 3, the remote device 440 downloads one or more pre-cache messages to be pre-cached on-board, or locally accessible to, the computing device 410.

The user of the computing device 410 opens the web browser 420 and requests download of an item of online content, such as a Web page, generally as described in connection with the element 110 of FIGS. 1 and 2. The computing device 410 consults the pre-cache, along with any instructions for selecting pre-cached messages as described in connection with the element 120 of FIGS. 1 and 2, and displays the selected pre-cached message as per the element 125.

The user-requested item of content proceeds to download over the network 450 to the computing device 410. When it has arrived, it is displayed in a manner such as that of elements 130 and 135 of the embodiment of FIG. 1, or the elements 205 and 210 of the embodiment of FIG. 2.

Block Diagram of User Appliance—Computing Device

Figure 5:
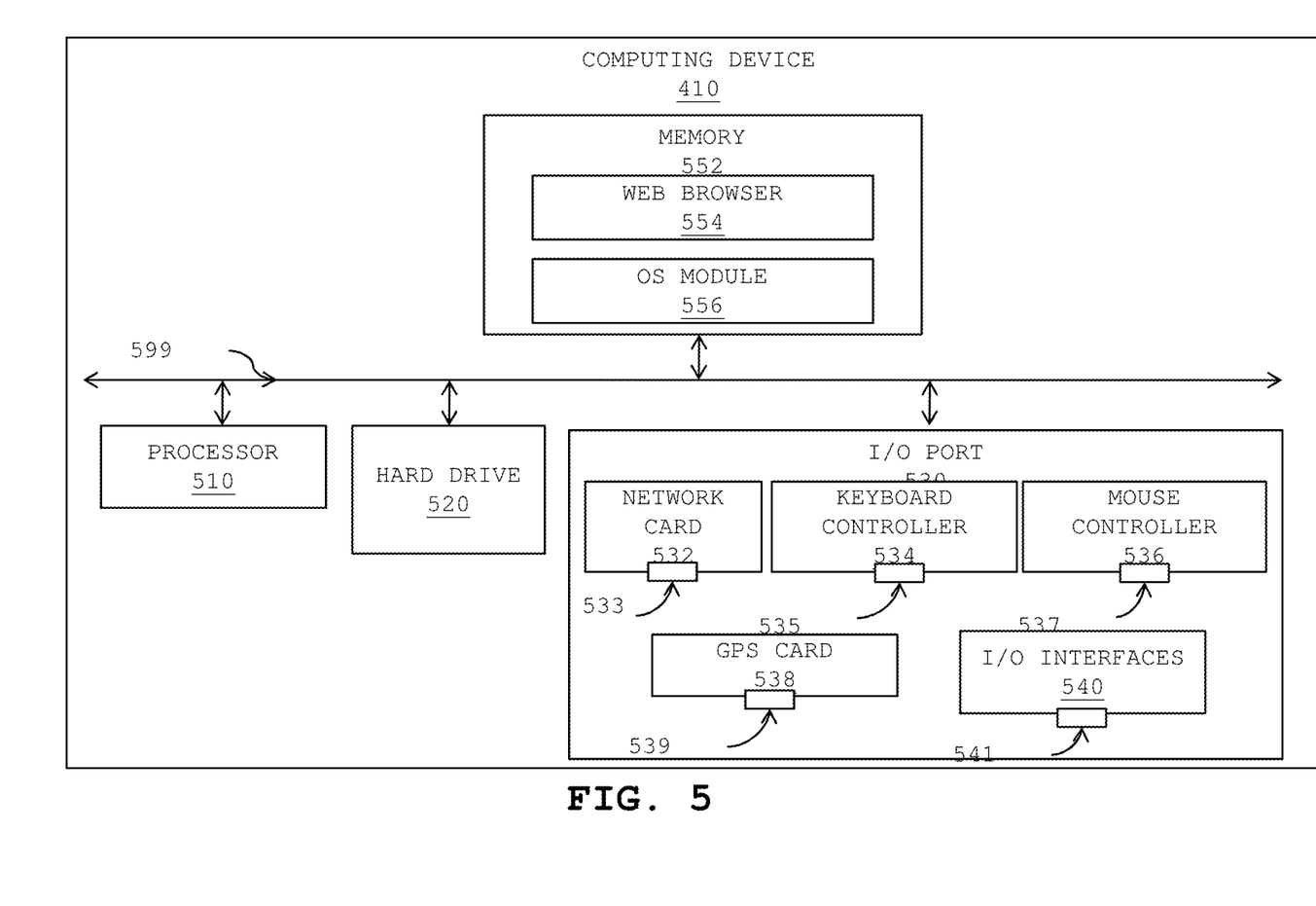
FIG. 5 is a system block diagram of user computer appliance as per an embodiment of the present subject matter.

Additional embodiments of the computing device 410 are described in detail in conjunction with FIG. 5.

FIG. 5 is a block diagram illustrating an exemplary computing device, for example the computing device 410 in accordance with one embodiment. The computing device 410 includes a processor 510, a hard drive 520, an I/O port 530, and a memory 552, coupled by a bus 599.

The pre-cache described in connection with the above embodiments may, for instance, reside on the hard drive 520, or within the memory 552. The processor 510 may execute software program code, stored on the hard drive 520 or in the memory 552, for executing instructions to implement the functionality of embodiments such as those described above.

The bus 599 can be soldered to one or more motherboards. Examples of the processor 510 includes, but is not limited to, a general purpose processor, an application-specific integrated circuit (ASIC), an FPGA (Field Programmable Gate Array), a RISC (Reduced Instruction Set Controller) processor, or an integrated circuit. The processor 510 can be a single core or a multiple core processor. In one embodiment, the processor 510 is especially suited for processing demands of location-aware reminders (for example, custom micro-code, and instruction fetching, pipelining or cache sizes). The processor 510 can be disposed on silicon or any other suitable material. In operation, the processor 510 can receive and execute instructions and data stored in the memory 552 or the hard drive 520. The hard drive 520 can be a platter-based storage device, a flash drive, an external drive, a persistent memory device, or other types of memory.

The hard drive 520 provides persistent (long term) storage for instructions and data. The I/O port 530 is an input/output panel including a network card 532 with an interface 533 along with a keyboard controller 534, a mouse controller 536, a GPS card 538 and I/O interfaces 540. The network card 532 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 533 is configured according to networking compatibility. For example, a wired networking card includes a physical port to plug in a cord, and a wireless networking card includes an antennae. The network card 532 provides access to a communication channel on a network. The keyboard controller 534 can be coupled to a physical port 535 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 536 can also be coupled to a physical port 537 (for example, mouse or USB port). The GPS card 538 provides communication to GPS satellites operating in space to receive location data. An antenna 539 provides radio communications (or alternatively, a data port can receive location information from a peripheral device). The I/O interfaces 540 are web interfaces and are coupled to a physical port 541.

The memory 552 can be a RAM (Random Access Memory), a flash memory, a non-persistent memory device, or other devices capable of storing program instructions being executed. The memory 552 comprises an Operating System (OS) module 556 along with a web browser 554. In other embodiments, the memory 552 comprises a calendar application that manages a plurality of appointments. The OS module 556 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, IRIX64, or any version of Android.

The web browser 554 can be a desktop web browser (for example, Internet Explorer, Mozilla, Safari, or Chrome), a mobile browser, or a web viewer built integrated into an application program. In an embodiment, a user accesses a system on the World Wide Web (WWW) through a network such as the Internet. The web browser 554 is used to download the web pages or other content in various formats including HTML, XML, text, PDF, postscript, python and PHP and may be used to upload information to other parts of the system. The web browser may use URLs (Uniform Resource Locators) to identify resources on the web and HTTP (Hypertext Transfer Protocol) in transferring files to the web.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

User Implementations

Embodiments of the above-discussed subject matter can be surfaced to the user. Such embodiments of network messaging service, such as e-mail service, may be considered by users to be competitively advantageous, relative to conventional systems. In a further embodiment, there can be an automatic generated folder of machine/human generated e-mail. In another embodiment, there could be a spreadsheet-style filtration option, enabling the user to see only messages from one of the classes. Users may find this to be an expedient way of sorting messages by whether or not they are interesting or high-priority.

Classification tools and techniques as described herein can also be used as a tool for other features. In general, the messaging "in-box" approach may be considered limiting, in that it is specialized for human generated e-mail. By contrast, embodiments of the present subject matter may provide specialized views of types of machine generated email.

Another embodiment may be directed to extraction. When a user system deals with machine generated e-mail, the information to be extracted is very different from that in human generated e-mail. Identifying whether the message was sent by an automated process or a human may facilitate efficient methods for specialized data extraction.

CONCLUSION

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer system for communicating electronic messages over a communication network coupled thereto, the computer system comprising:
   a network interface for receiving new messages sent over the network and addressed to a user of the computer system; and
   computer executable electronic message processing software comprising instructions for directing the computer system to:
      execute an offline phase to categorize a plurality of uncategorized historical messages stored on the computer system, the offline phase comprising:
         retrieving the historical messages from a local memory of the computer system;
         retrieving resource information from the local memory, the resource information including a library of network addresses associated with known senders, and
         categorizing the historical messages as generated by an automated process based on determining whether a network address of a respective historical messages is included within the library of known network addresses;
      train a classifier using the categorized historical messages, the classifier configured to generate a quantitative value representing a probability that a new message is generated by the automated process;
      receive a message over the network;
      identify whether a received electronic message is generated by the automated process, the identifying comprising:
         transmitting an identity of the sender to a remote network entity and receiving a remote classification of the sender from the remote network entity,
         classifying the received electronic message using the classifier, the classifying generating a quantitative prediction that the received electronic message is generated by the automated process, and
         identifying whether the sender is the automated process based on the remote classification and the classifying using the classifier;
      provide the user with the results of the identification and corresponding information of the message, the providing comprising:
         determining one or more types of the message based on one or more characteristics in the message, the one or more characteristics including a keyword count within a leading sentence of the message;
         automatically extracting information from the message based on the determined one or more types of the message; and
         sending the user the extracted information.

2. A computer system as recited in claim 1, wherein the offline phase further includes identifying, within the body of the message, at least one of spelling errors, grammatical errors, slang expressions, and references to topical and popular cultural elements.

3. A computer system as recited in claim 1, wherein the offline phase further includes identifying, within the body of the message, personal and formal occurrences of the user's name.

4. A computer system as recited in claim 1, wherein:
the software further comprises results of machine-learning training performed on a set of past messages known to be generated by the automated process; and
the offline phase includes applying machine learning, in accordance with the results of the training, to determine whether the messages originated with the automated process.

5. A computer system as recited in claim 1, wherein the online phase includes weight classification as to a number of messages sent by the sender, wherein, if the number of messages exceeds a threshold, then the message is deemed to be from the automated process.

6. A computer system as recited in claim 1, wherein the online phase further includes referring to a map of identified senders, correlated with whether each respective sender is the automated process.

7. A computer program product for directing a computer system which communicates electronic messages over a communication network coupled thereto, the computer program product comprising:
a non-transitory computer-readable medium; and
software program code provided on the computer-readable medium, for directing the computer system to perform the actions of:
executing an offline phase to categorize a plurality of historical messages stored on the computer system, the offline phase comprising:
retrieving the historical messages from a local memory of the computer system;
retrieving resource information from the local memory, the resource information including a library of network addresses associated with known senders, and
categorizing the historical messages as generated by an automated process based on determining whether a network address of a respective historical messages is included within the library of known network addresses;
training a classifier using the categorized historical messages, the classifier configured to generate a quantitative value representing a probability that a new message is generated by the automated process;
receiving a message that was sent over the network through a network interface of the computer system, the message being addressed to a user of the computer system;
identifying whether a received electronic message is generated by the automated process, the identifying comprising:
transmitting an identity of the sender to a remote network entity and receiving a remote classification of the sender from the remote network entity,
classifying the received electronic message using the classifier, the classifying generating a quantitative prediction that the received electronic message is generated by the automated process, and
identifying whether the sender is the automated process based on the remote classification and the classifying using the classifier;
providing the user with the results of the identification and corresponding information of the message, the providing comprising:
determining one or more types of the message based on one or more characteristics in the message, the one or more characteristics including a keyword count within a leading sentence of the message;
automatically extracting information from the message based on the determined one or more types of the message; and
sending the user the extracted information.

8. A computer program product as recited in claim 7, wherein the offline phase further includes identifying, within the body of the message, at least one of spelling errors, grammatical errors, slang expressions, and references to topical and popular cultural elements.

9. A computer program product as recited in claim 7, wherein the offline phase further includes identifying, within the body of the message, personal and formal occurrences of the user's name.

10. A computer program product as recited in claim 7, wherein:
the software program code further comprises results of machine-learning training performed on a set of past messages known to be generated by the automated process; and
the offline phase includes applying machine learning, in accordance with the results of the training, to determine whether the messages originated with the automated process.

11. A computer program product as recited in claim 7, wherein the online phase includes weight classification as to a number of messages sent by the sender, wherein, if the number of messages exceeds a threshold, then the message is deemed to be from the automated process.

12. A computer program product as recited in claim 7, wherein the online phase further includes referring to a map of identified senders, correlated with whether each respective sender is the automated process.

13. A computer-implemented method for directing a computer system which communicates electronic messages over a communication network coupled thereto, the method comprising:
executing an offline phase to categorize a plurality of historical messages stored on the computer system, the offline phase comprising:
retrieving the historical messages from a local memory of the computer system,
retrieving resource information from the local memory, the resource information including a library of network addresses associated with known senders, and
categorizing the historical messages as generated by an automated process based on determining whether a network address of a respective historical messages is included within the library of known network addresses;
training a classifier using the categorized historical messages, the classifier configured to generate a quantitative value representing a probability that a new message is generated by the automated process;
receiving a message that was sent over the network through a network interface of the computer system, the message being addressed to a user of the computer system;
identifying whether the sender of the received electronic message is generated by the automated process, the identifying comprising:
transmitting an identity of the sender to a remote network entity and receiving a remote classification of the sender from the remote network entity, classifying the received electronic message using the classifier, the classifying generating a quantitative prediction that the received electronic message is generated by the automated process, and identifying whether the sender is the automated process based on the remote classification and the classifying using the classifier;

providing the user with the results of the identification and corresponding information of the message through a user output interface of the computer system, the providing comprising:

determining one or more types of the message based on one or more characteristics in the message, the one or more characteristics including a keyword count within a leading sentence of the message;

automatically extracting information from the message based on the determined one or more types of the message; and sending the user the extracted information.

14. A computer-implemented method as recited in claim 13, wherein the offline phase further includes identifying, within the body of the message, at least one of spelling errors, grammatical errors, slang expressions, and references to topical and popular cultural elements.

15. A computer-implemented method as recited in claim 13, wherein the offline phase further includes identifying, within the body of the message, personal and formal occurrences of the user's name.

16. A computer-implemented method as recited in claim 13, wherein:

the computer system includes memory having stored therein results of machine-learning training performed on a set of past messages known to be generated by the automated process; and the offline phase includes applying machine learning, in accordance with the results of the training, to determine whether the messages originated with the automated process.

17. A computer-implemented method as recited in claim 13, wherein the online phase includes weight classification as to a number of messages sent by the sender, wherein, if the number of messages exceeds a threshold, then the message is deemed to be from the automated process.

18. A computer-implemented method as recited in claim 13, wherein the online phase further includes referring to a map of identified senders, correlated with whether each respective sender is the automated process.

* * * * *